United States Patent
Phipps et al.

(10) Patent No.: US 6,530,212 B1
(45) Date of Patent: Mar. 11, 2003

(54) LASER PLASMA THRUSTER

(75) Inventors: Claude R. Phipps, Santa Fe, NM (US); James Luke, Albuquerque, NM (US)

(73) Assignee: Photonic Associates, Santa Fe, NM (US)

(*) Notice: Subject to any disclaimer, the term of this patent is extended or adjusted under 35 U.S.C. 154(b) by 0 days.

(21) Appl. No.: 09/792,945

(22) Filed: Feb. 26, 2001

Related U.S. Application Data (60) Provisional application No. 60/185,184, filed on Feb. 25, 2000.

(51) Int. Cl.⁷ ............................. F02K 11/00; H05H 1/24
(52) U.S. Cl. .......................................... 60/203.1; 60/204
(58) Field of Search ................................ 60/203.1, 202, 60/204

(56) References Cited

U.S. PATENT DOCUMENTS

| | | | |
|---|---|---|---|
| 3,392,527 A | * 7/1968 | Gilmour, Jr. et al. | 60/202 |
| 3,825,211 A | * 7/1974 | Minovitch | 244/172 |
| 4,036,012 A | 7/1977 | Monsler | |
| 4,142,088 A | * 2/1979 | Hirsch | 219/121 L |
| 4,426,843 A | * 1/1984 | Fowler et al. | 60/203.1 |
| 4,535,219 A | * 8/1985 | Sliwa, Jr. | 219/121.14 |
| 4,666,678 A | * 5/1987 | Lemelson | 204/157.61 |
| 5,020,411 A | 6/1991 | Rowan | |
| 5,142,861 A | 9/1992 | Schlicher et al. | |
| 5,152,135 A | 10/1992 | Kare | |
| 5,206,455 A | 4/1993 | Williams et al. | |
| 5,542,247 A | 8/1996 | Bushman | |
| 5,602,386 A | * 2/1997 | Neuberger | 250/216 |
| 5,924,278 A | * 7/1999 | Burton et al. | 60/203.1 |
| 5,968,037 A | * 10/1999 | Rizoiu et al. | 606/10 |

OTHER PUBLICATIONS

Phipps, Claude R., "Micro Laser Plasma Thrusters for Small Satellites," Jul. 1999, pp. 1–54.*
Http://www.sbirsttr.com/sbirmisc/sttr1_98.htm, *Technical Abstract, Micro Laser Plasma Thrusters for Small Satellites.*

* cited by examiner

*Primary Examiner*—Ted Kim
(74) *Attorney, Agent, or Firm*—Jeffrey D. Myers (57) ABSTRACT

A spacecraft thruster and propulsion method comprising a laser directed at an ablation target, wherein when the laser is operating, material ablates from the ablation target, thereby generating a thrust vector on the spacecraft.

39 Claims, 4 Drawing Sheets

LASER PLASMA THRUSTER

CROSS-REFERENCE TO RELATED APPLICATIONS

This application claims the benefit of the filing of U.S. Provisional Patent Application Serial No. 60/185,184, entitled "Semiconductor-Diode-Laser-Driven Thrusters for Space Vehicles", filed on Feb. 25, 2000, and the specification thereof is incorporated herein by reference.

GOVERNMENT RIGHTS

The U.S. Government has a paid-up license in this invention and the right in limited circumstances to require the patent owner to license others on reasonable terms as provided for by the terms of Contract Nos. F49620-98-C-0038 and F49620-00-C-0005 awarded by the United States Air Force Office of Scientific Research.

BACKGROUND OF THE INVENTION

1. Field of the Invention (Technical Field)

The present invention relates to spacecraft propulsion, particularly to micropropulsion.

2. Background Art

Note that the following discussion refers to a number of publications by author(s) and year of publication, and that due to recent publication dates certain publications may not be considered as prior art vis-a-vis the present invention. Discussion of such publications herein is given for more complete background and is not to be construed as an admission that such publications are prior art for patentability determination purposes.

Throughout most of the history of space propulsion, the emphasis has been on producing rocket engines with ever larger thrust. Now, with the advent of microsatellites (>10 kg), nanosatellites (1–10 kg) and even picosatellites (<1 kg), this trend is reversing in one branch of motor development. The move toward micro- and nano-satellites in the 1 to 10-kg mass range places severe challenges on conventional technologies for orientation thrusters. It is obvious that these need to be efficient, extremely lightweight, long-life devices with high specific impulse ($I_{sp}$), which is the exhaust velocity divided by the acceleration of gravity.

A motor on a 10-cm lever arm producing a minimum impulse bit (MIB) of 1 nano N-s will steer a 1 kg satellite with angular velocity bits of order 25 nrad/sec. This impulse is an order of magnitude less than the momentum developed by a flying mosquito.

Desirable features of such a steering engine are: Mass ≦200 g; Size of order 1×5×10 cm; High specific impulse; 0.1 millidyn-s MIB; 10,000:1 single impulse dynamic range; Continuous thrust 10 dyn (0.1 milli-N); Very large thrust dynamic range; Power consumption 3 W; Very low off-state power; Direct spacecraft bus voltage input; No nozzle; Lifetime impulse (1000 N-s) sufficient to re-enter a 10 kg satellite from Low Earth Orbit (LEO); Inexpensive, common, nonpolluting fuel materials; Inexpensive components; and robotic operation with simple external commands.

The present invention is of a new type of thruster that has demonstrated a 1 nano newton-s MIB in a 100 $\mu$s pulse and provides most or all of the desirable features noted above. The thruster can operate continuously, though repetitively-pulsed operation may be convenient for programming force output. Single impulse dynamic range is nearly five orders of magnitude. The invention is of a Laser Plasma Thruster (LPT), preferably employing a semiconductor laser with sufficient brightness to produce a vapor or plasma jet on a surface in vacuum. The invention preferably uses a simple low voltage semiconductor switch to drive the laser. A lens focuses the laser diode output on the ablation target within a very small spot, producing a spark or miniature jet that produces the thrust.

Table 1 illustrates features of the present invention in comparison to prior art thrusters:

TABLE 1

Prior Art Comparison
(L:low, M:moderate, H:high, V:very)

| Type | Laser | Ion | PPT | Resistojet |
|---|---|---|---|---|
| Specific Impulse $I_{SP}$ | H | VH | H | VL |
| Thrust to Power Ratio | H | VL | M | VH |
| Operating Life | VH | VH | H | M |
| Energy Efficiency | VH | VH | H | L |
| Min. Impulse Bit | VL | M | M | M |
| Mass | L | M | M | L |
| Output Range | VH | M | M | L |
| Fuel Cost | VL | L | M | M |
| Predictable Physics? | VH | M | M | H |

There are obvious problems with scaling chemical thruster and other conventional engine types to microscale. Some of these problems are: a) Unpredictable physical regimes are entered when the characteristic dimensions of the nozzles in such devices are so small that gas flow can no longer be characterized by the theory of viscous fluid flow. The assumption of a continuum on which fluid dynamics is based disappears when the mean free path is no longer much smaller than the nozzle diameter. For a 1 $\mu$m nozzle, this assumption is strongly compromised at 10 bar pressure. b) Boundary layer effects become dominant in $\mu$m-scale nozzles, an important complication for pulsed gas jets and micro-chemical thrusters. As a result, only pulsed plasma thrusters (PPTs) offer realistic alternatives to the laser plasma thruster of the invention for micropropulsion. Micro PPTs must operate from high voltage power supplies, which can increase the mass of a thruster system. They have added difficulties associated with ensuring uniform electrode erosion during operation, unintended electrical breakdown, and ensuring mechanical advance of the plastic dielectric which is ablated by the electrical discharge.

Prior patents illustrative of the prior art include: U.S. Pat. No. 4,036,012, to Monsler et al., entitled "Laser Powered Rocket Engine", discloses a ground-based carbon dioxide gas laser operating at 10.6 micrometers directed at a large mirror on the space vehicle, which is then focused into a gas to produce thrust. U.S. Pat. No. 5,020,411, to Rowan, entitled "Mobile Assault Logistic Kinematic Engagement Device", discloses a plasma thruster in which electricity creates a plasma in a gas to produce thrust. U.S. Pat. No. 5,142,861, to Schlicher et al., entitled "Nonlinear Electromagnetic Propulsion System and Method", discloses a photon rocket providing thrust solely by launching a beam of light. U.S. Pat. No. 5,152,135, to Kare, entitled "Reflector for Efficient Coupling of Laser Beam to Air or Other Fluids", discloses laser propulsion in which laser energy is absorbed "in air or other fluid", with the laser being on the ground or remotely based. U.S. Pat. No. 5,206,455, to Williams et al., entitled "Laser Initiated Ordnance Systems", discloses a laser-driven detonator. U.S. Pat. No. 5,542,247, to Bushman, entitled "Apparatus Powered Using Laser Supplied Energy", discloses a laser driven thruster with laser energy absorbed in a gas (air).

SUMMARY OF THE INVENTION
(DISCLOSURE OF THE INVENTION)

The present invention is of a spacecraft thruster and propulsion method comprising: providing a laser and directing the laser at an ablation target, wherein when the laser is operating, material ablates from the ablation target, thereby generating a thrust vector on the spacecraft. In the preferred embodiment, a semiconductor diode laser is employed or a plurality of semiconductor diode lasers pumping a solid state laser, such as a glass fiber laser. The laser may in fact be located remotely from the spacecraft. The laser is preferably driven with a pulser, most preferably a semiconductor switch. Laser light is focused on the ablation target, preferably within a spot of between approximately 5 and 200 micrometers in diameter for laser light of 1 W power. The ablation target is preferably a substantially light-absorbing (e.g., black) pigment suspended in a polymer, preferably polyvinylchloride and polymethylmethacrylate. For the transmission mode embodiment of the invention, the polymer is supported by a transparent layer (e.g., a second, transparent polymer or an optical glass) through which laser light passes before striking the pigment suspended in the polymer. The ablation target is preferably a tape transported across the focus of the laser. The ablation of the material from the ablation target forms a plasma jet, which need not be confined by a nozzle. The plasma jet is substantially electrically neutral. Continuous thrust of at least approximately 0.4 mN is produced.

A primary object of the present invention is to provide a low mass, efficient, long life, pulsed thruster for low-thrust applications onboard satellites.

A primary advantage of the present invention is that it provides a specific impulse (exhaust velocity divided by the acceleration of gravity) larger than reported by chemical rockets, resistojets or electrically pulsed plasma thrusters because of the high temperature of the vapor or plasma produced by a focused laser.

Another advantage of the present invention is that it provides a wide operating range for impulses generatable by a single device (100,000:1).

An additional advantage of the present invention is that it provides a nearly infinite force range in a single device, because it can be operated in any mode ranging from continuous operation to, for example, one pulse per month.

A further advantage of the present invention is that it can be implemented with a total mass of a few ounces for an engine which can maintain orientation of a nanosatellite or change its orbit.

Still another advantage of the present invention is that it can be extended to larger scale using other kinds of lasers than semiconductor diode lasers on board the spacecraft.

Yet another advantage of the present invention is that it can be extended to larger-scale propulsion systems in which a remote laser of arbitrary power located, for example, on the Earth, the Moon, or another space station propels a distant object or spacecraft using the same physical principles.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention is of a Laser Plasma Thruster (LPT), preferably employing a diode or glass fiber laser with sufficient brightness to produce a vapor or plasma jet on a surface in vacuum, although other gas or solid-state lasers with sufficient power may be employed. The invention preferably uses a simple low voltage semiconductor switch to drive the laser. A lens focuses the laser diode output on the ablation target within a very small spot, producing a spark or miniature jet that produces the thrust. The invention can have a 1 nano newton-s minimum impulse bit (MIB) in a 100 $\mu$s pulse, with continuous thrust available with today's semiconductor diode lasers of between 0.4 mN and 10 mN. The thruster can operate continuously, though repetitively-pulsed operation is convenient for programming force output. Single impulse dynamic range is nearly five orders of magnitude in the preferred embodiment. Laser ablation is preferably of a solid or condensed phase surface in vacuum, not necessarily with a nozzle, to produce thrust. Laser wavelength is not critical, but wavelengths near 1 micrometer (e.g., 935 nm) will be more effective than, for example, near 10 micrometers because of the difficulty of focusing the longer wavelength light.

Figure 1A:
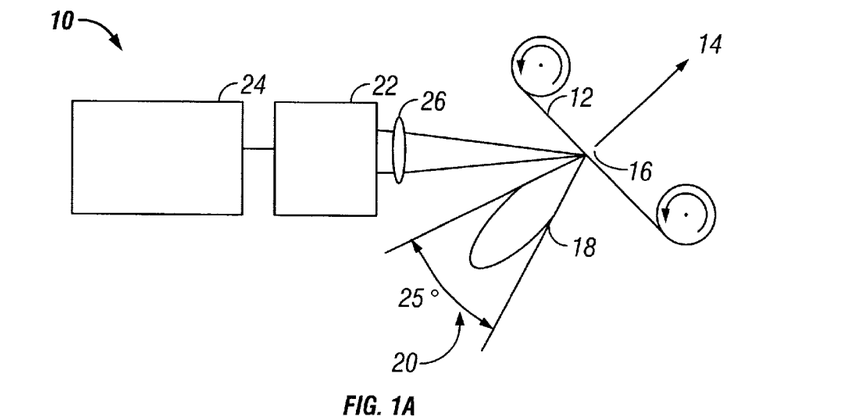
FIGS. 1(a)–(c) are block diagrams of the preferred embodiments of the invention.
Figure 1B:
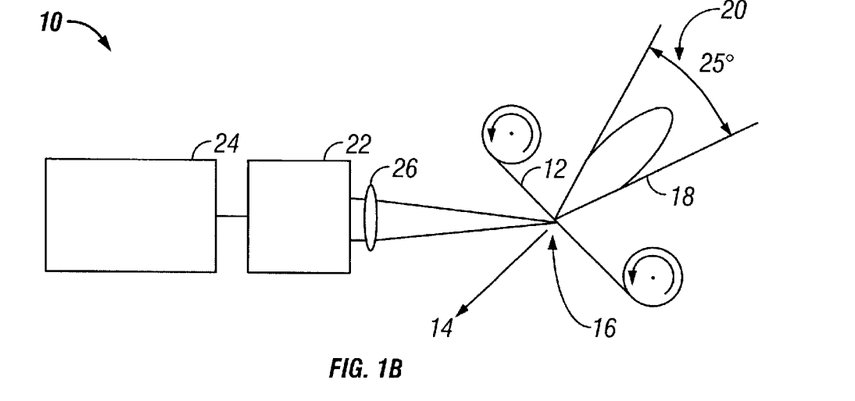

The preferred LPTs 10 are shown in FIGS. 1(a)–(b), with programmable pulser or continuous power supply 24 semiconductor diode laser 22, lens 26, target tape 12 having focal spot 16 (such as a 20×100 μm focal spot), and electrostatic-force-created nozzle 18. A plasma jet 20 perpendicular to the target tape surface is created, which can have an $I_{sp}$ of 1000 s or greater, resulting in thrust vector 14, which can have, for example, a minimum 1E-4 dyn-s impulse bit. FIG. 1(a) illustrates a reflection mode embodiment, and FIG. 1(b) illustrates a transmission mode embodiment. In reflection mode, the target may be a solid block rather than a tape. No nozzle is required because electrostatic forces involved in the plasma expansion control the shape of the plasma jet, although a nozzle is not prohibited. The direction of the jet is controlled by the orientation of the target, and is always normal to its surface. The plume produced mainly comprises a high-velocity, electrically neutral, directed plasma jet.

Figure 1C:
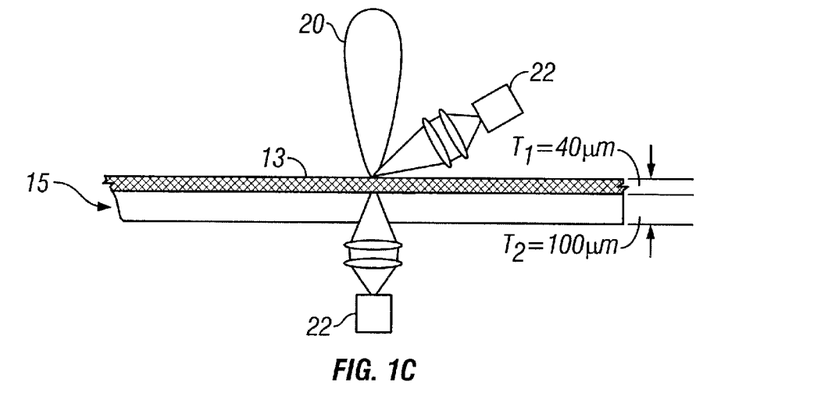

FIG. 1(c) illustrates certain advantages and disadvantages as between the reflection and transmission mode embodiments. An advantage of reflection mode is that $I_{sp}$ and $C_m$ are ordinarily about twice as great, but the disadvantage is a somewhat awkward geometry. In transmission mode, the target preferably comprises ablator 13 (e.g., a polymer suspending black pigment) and transparent substrate 15 (e.g., a transparent polymer), with thicknesses $t_1$ (such as approximately 40 μm) and $t_2$ (such as approximately 100 μm), respectively. Advantages of transmission mode include better protection for optics and a more straightforward geometry. The disadvantage is lower $I_{sp}$ and $C_m$, but these may be heightened by making the ablator from energetic polymers or polymers doped with narrowband absorbers tuned to the laser wavelength. In this way, it is further possible to create a distribution of absorptivity in the ablating layer which optimizes $I_{sp}$ and $C_m$ in the transmission mode. It is important to realize that the transparent substrate also participates in creating thrust, as it is ablated by radiation and conduction from the high-temperature laser-heated ablator.

The preferred laser for the LPT of the invention is one or more high brightness semiconductor diode lasers or one or more low brightness semiconductor diode lasers pumping a high brightness glass fiber or other solid state laser (including Q-switched solid state lasers) as a source of energy. The preferred pulser is a simple but efficient low voltage semiconductor switch pulser to drive the laser without wasting electrical power. The preferred lens is a lens or other focusing system to bring the light output of the laser to a target with sufficiently small spot to produce the required plasma jet according to specifications of FIG. 2. As an example, for the smallest impulse increments desired, one billionth of a newton-second, it is necessary with one watt peak power single-transverse-mode diode lasers to focus the laser output reliably within a 5 micrometer diameter spot during a pulse at least 100 microseconds in duration. At the other extreme, multi-transverse-mode diode lasers may be focused reliably within a 100-micrometer diameter spot and operated continuously to produce a continuous thrust of 0.1 milli-newton. It is preferred to use targets with low light reflectivity, low thermal conductivity and relatively low boiling temperatures to maximize efficiency of conversion of laser energy to energy of the laser produced jets, minimizing heat which would otherwise be wasted heating the substrate of the light absorbing material. Examples are: black coating of carbon-loaded polyvinylchloride (PVC) or polymethylmethacrylate (PMMA) preferably 40 micrometers thick on a transparent substrate of polyethyleneterephthalate (PET), or other polyester or polyimide resin film.

Laser ablation is the process by which a laser heats a solid surface sufficiently to eject atoms from the surface. This process is complex, and can involve "phase explosion" as well as vapor production and plasma formation in the vapor immediately above the surface. The nearly diffraction-limited beams of flare-type diffraction-limited laser diodes can be focused to 5 μm diameter at full-width half maximum (FWHM) with simple lenses, so that 1 watt of laser power can produce 1 $MW/cm^2$ on a target continuously, or with any pulse duration at which the diode can be operated. Semiconductor laser diodes are constant-power (non-storage) laser. Other important features of laser diodes are 40–60% electrical efficiency, and mean-time-between-failure (MTBF) of 1 million hours. Some types of diode can be operated continuously at full power at temperatures up to 95° C.

The maximum momentum per joule of incident laser light is produced at a fluence $\Phi_{opt}$ which is at or just beyond the threshold for plasma formation, because plasma inhibits coupling. Even with laser spot size $d_s$ as small as 5 μm, impulse coupling efficiency $C_m$ and the fluence $\Phi_{opt}$ ($J/cm^2$) at which it occurs are well-predicted by theory. Apart from slowly varying factors related to dimensionality of the expansion and the ratio of $d_s$ to thermal penetration depth during the pulse, estimates based on the cm-scale interactions will apply. Because physics does scale well to μm sizes for the laser ablation process, the "predictable physics" entry in Table 1 favors laser microthrusters.

Figure 2:
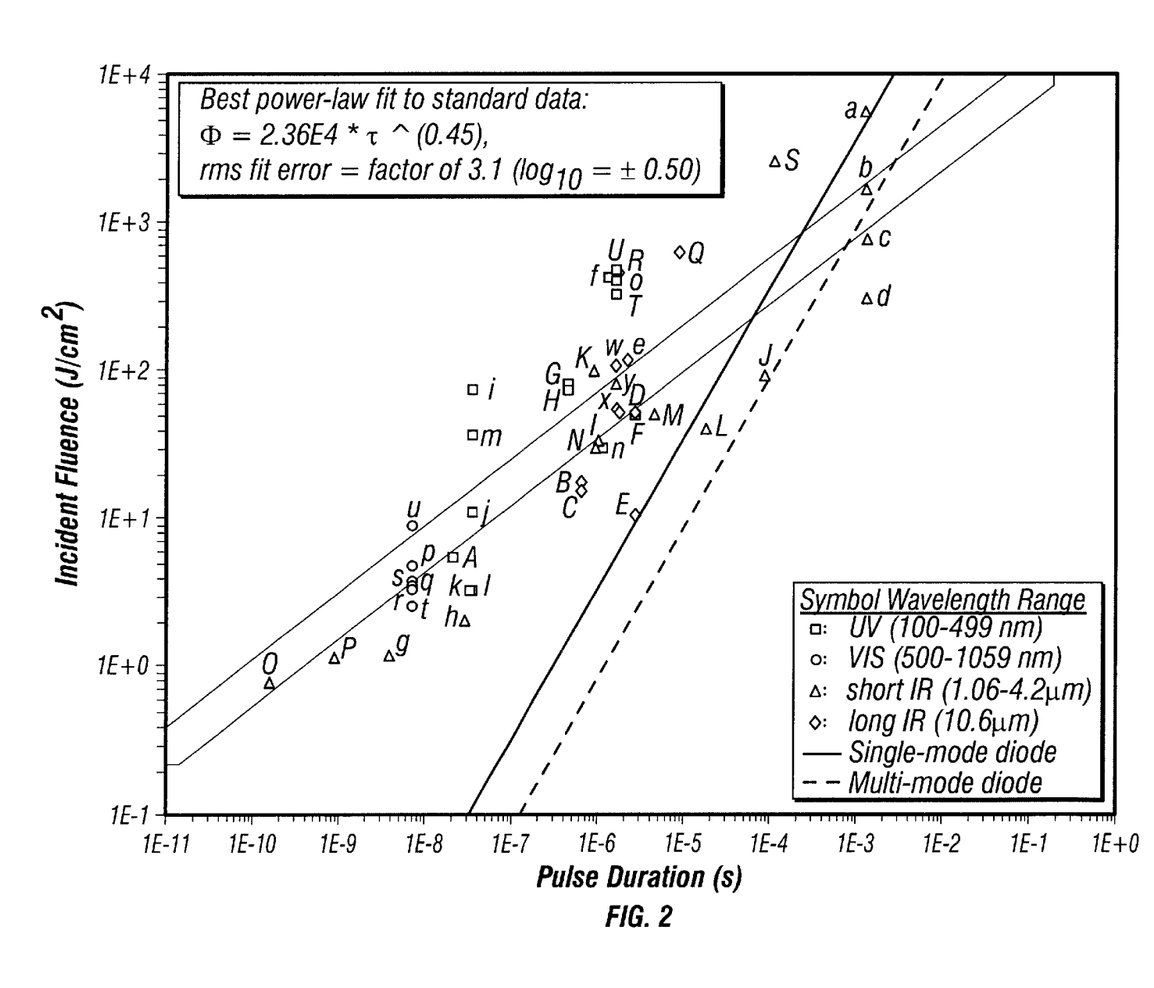
FIG. 2 is a graph of estimated fluence required to be incident on the target vs. pulse duration T for peak coupling and plasma formation from 46 data sets reported in the literature for which peak coupling was recorded. The broad gray bar $\Phi = A_T{}^B$ with A=2.38E4 and B=0.45 represents the best fit to the data. Thermal theory gives B=0.50. Wavelengths for the data are indicated in the box in the lower righthand corner. The solid gray line is the fluence produced by a 0.66W, single-transverse-mode diode with 5-$\mu$m spot size. The dashed gray line is fluence produced by a 2W multi-mode diode imaged to a 1×100-$\mu$m spot on target. Either one can produce a plasma and achieve $\Phi_{opt}$ with pulses longer than 100 $\mu$s.

Estimated fluence required to produce plasma jets on a surface are summarized in FIG. 2, which predicts that diodes with pulse durations greater than 100 μs will be able to produce plasma jets. However, Table 2 shows that 2–20 times greater fluence than the FIG. 2 values will be required to compensate thermal conductance with very small spots and relatively long pulses in metallic materials. For example, it should be difficult to produce a spark on copper with a 1-watt laser.

TABLE 2

Comparing thermal diffusion distance $X_{th}$ during 100 μs with $d_s = 5$ μm for several materials.

| Material | $X_{th}$(100 μs) | $X_{th}/d_s$ |
|---|---|---|
| PMMA | 1.1 μm | 0.22 |
| Polyvinylchloride | 3.1 μm | 0.62 |
| Silica | 9.2 μm | 1.7 |
| CarbonPhenolic | 40 μm | 8.0 |
| TungstenCarbide | 50 μm | 9.9 |
| Copper | 110 μm | 21 |
| Graphite | 130 μm | 25 |

Laser Impulse Coupling Physics. The momentum coupling coefficient $C_m$ is defined as the ratio of target momentum mΔv produced to incident laser pulse energy W during the ejection of laser-ablated material (the photoablation process):

$$C_m = \frac{m\Delta v}{W} N/W. \qquad (1)$$

In the ablation process, Q* joules of laser light (the asterisk is customary notation: Q* is not a complex number) are consumed to ablate each gram of target material:

$$Q^* = \frac{W}{\Delta m} J/kg. \qquad (2)$$

For the sake of discussion, consider a monoenergetic exhaust stream with velocity $v_E$, and because momentum conservation requires $$m\Delta v = \Delta m v_E, \quad (3)$$

then the product of $C_m$ and $Q^*$ is the effective exhaust velocity $v_E$ of the laser rocket, independent of the efficiency with which laser energy is absorbed. This can be seen by writing:

$$C_m Q^* = \frac{(N-s)(J)}{(J)(kg)} = \frac{m}{s}. \quad (4)$$

If for example, a significant amount of the incident energy is absorbed as heat in the target substrate rather than producing material ejection, $Q^*$ will be higher and $C_m$ will be proportionately lower, giving the same velocity in the end.

While it is understood that real exhaust streams have velocity distributions, monoenergetic stream approximation will not introduce large errors ($<v^2>/<v>^2 \approx 1.15$) for laser-produced plasmas, and the principal points to be made are easier to understand using the assumption. In the absence of a nozzle, $v_E$ is simply related to the specific impulse $I_{sp}$:

$$C_m Q^* = v_E = g I_{sp} \, m/s. \quad (5)$$

Energy conservation prevents $C_m$ and $Q^*$ from being arbitrary. Increasing one decreases the other. Using Eqs. (1), (2), and (5), one sees that several constant product relationships exist:

$$2\eta_{AB} = \Delta m v_E^2 / W = C_m^2 Q^* = g C_m I_{sp} = C_m v_E. \quad (6)$$

In Eq. (6), introduced is the ablation efficiency parameter, $\eta_{AB} \leq 1$, the efficiency with which laser energy W is converted into exhaust kinetic energy. Choosing combinations of $C_m$ and $v_E$ that exceed 2 violates physics, since $\eta_{AB}$ must be less than 1.

Since the maximum specific impulse of ordinary chemical rockets is about 500s, limited by the temperatures available in chemical reactions, exit velocity $v_E>5$ km/s ($I_{sp}>500$s) is accessible only by laser ablation or some other non-chemical process such as ion drives. Specific impulse $I_{sp}$ up to 8000s has been measured in KrF-laser ablation of aluminum.

Figure 3:
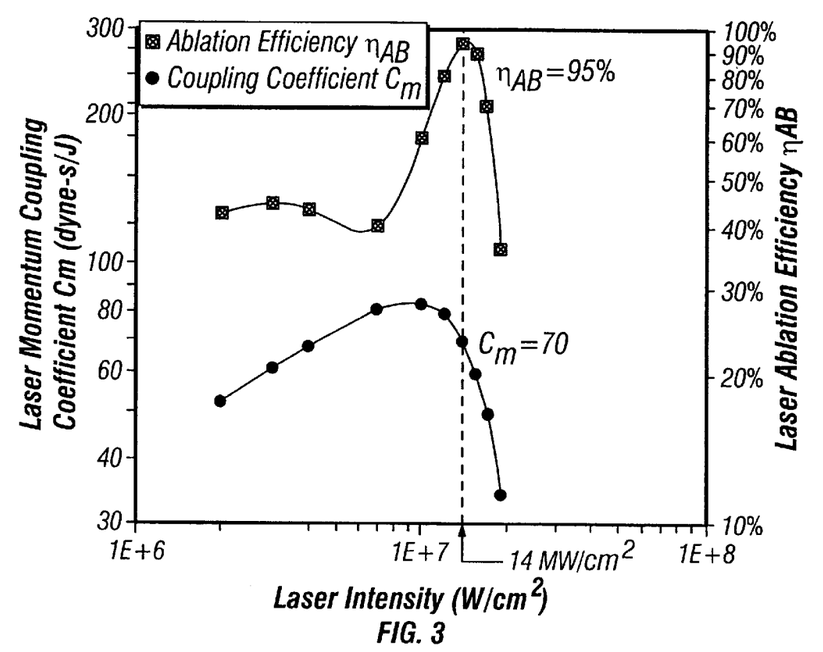
FIG. 3 is a graph of ablation efficiency $\eta_{AB}$ vs. pulse intensity, measured with a series of single, 2-$\mu$s pulses from a 10.6 $\mu$m wavelength laser on cellulose nitrate in vacuum.

Ablation efficiency can approach 100%, as direct measurements with other types of lasers on cellulose nitrate in vacuum verify, but a value of 50% or even less is likely (FIG. 3). The impact of $\eta_{AB}<1$ is that the $C_m$ value deduced from a given $v_E$ may be less than the maximum permitted by conservation of energy. Exit velocity $v_E$ is the fundamental quantity.

The vacuum coupling coefficient $C_m$ is in the range 0.01–0.1 mN-s/J for many standard surface-absorbing materials.

The laser ablation (plasma) thruster of the invention provides a light-weight and energy-efficient means to provide thrust for small satellites that leaves an electrically neutral particle trail.

Industrial Applicability

The invention is further illustrated by the following non-limiting examples.

EXAMPLE 1

Figure 4:
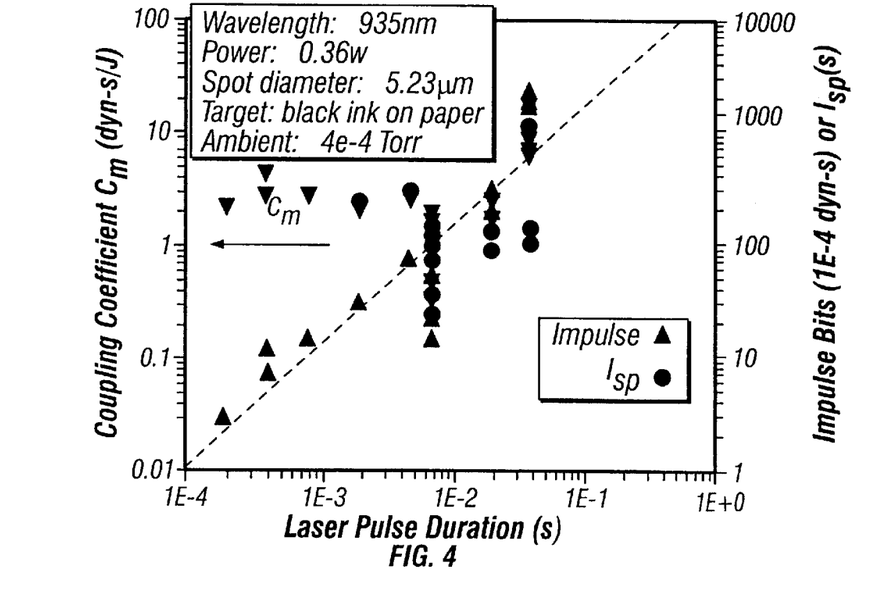
FIG. 4 is a graph of measured impulses from the micro laser plasma thruster (LPT) of Example 1 from 0.0004 to 0.33 dyn-s (4E-9 to 3.3E-6 N-s) using single pulses from a Spectra-Diode Labs, Inc. (SDLI) "flare"-type diode laser at 1W peak power and pulse durations shown. Coupling coefficients are shown on the left-hand axis.

The system illustrated in FIG. 1 was implemented with a diffraction-limited CW "flare"-type diode laser operating at 935 nm, manufactured by Spectra-Diode Labs, Inc. It operated with peak power=average power=2 W. Referring to FIG. 4, the best coupling coefficients were achieved for pulses of approximately 40 ms duration. The same value will be obtained with CW (continuous) laser illumination and transverse target transport.

Measurements have shown pulsed momentum coupling coefficients as large as $C_m$=20 dyn-s/J (0.2 mN-s/J) for pulses out to 80 ms. To obtain CW thrust, it is only necessary to provide a transverse feed mechanism for the target ribbon.

Typical $Q^*$ values of 90 MJ/kg were observed, corresponding to $I_{sp}$=1300 s for a high-$C_m$ target material.

The system illustrated in FIG. 2 was also implemented with a multi-transverse-mode CW diode By laser operating at 970 nm, also manufactured by SDLI, with peak power= average power=4 W.

EXAMPLE 2

A 0.4-mN thruster with the characteristics in Table 3 is easily achievable according to the invention. The measured coupling of Example 1 corresponds to a CW thrust conversion of 0.2 mN/W. With 2 W laser power, the thruster will generate 0.4 mN on a continuous basis, with a target ribbon transport moving at 0.0025 m/s. Preferably, the laser track on the target ribbon would be about 100 $\mu$m wide and 100 $\mu$m deep. A 0.01-m-wide target ribbon of 150-$\mu$m-thick material 90 m long (total mass 0.14 g) would provide continuous thrust for 1000 hours.

The laser itself would weigh 0.001 kg. Optics and target transport mechanism are estimated at 0.2 kg. 5 W total electrical power is required.

TABLE 3

Example 2 LPT Parameters

| Parameter | Value |
| --- | --- |
| $C_m$ | 0.2 mN/W |
| $Q^*$ | 90 MJ/kg |
| $I_{sp}$ | 1300 s |
| Laser output optical power | 2W |
| Laser wavelength | 970 nm |
| Laser electrical efficiency | 50% |
| Target spot size | 100 $\mu$m |
| Ablation depth | 100 $\mu$m |
| Continuous thrust | 0.4 mN |
| Total flight unit mass | 0.4 kg |
| Power consumption | 5W |
| Total target mass | 0.14 kg |
| Target transport speed | 2.5 mm/s |
| Thrust duration | 1000 hours |

EXAMPLE 3

Figure 5:
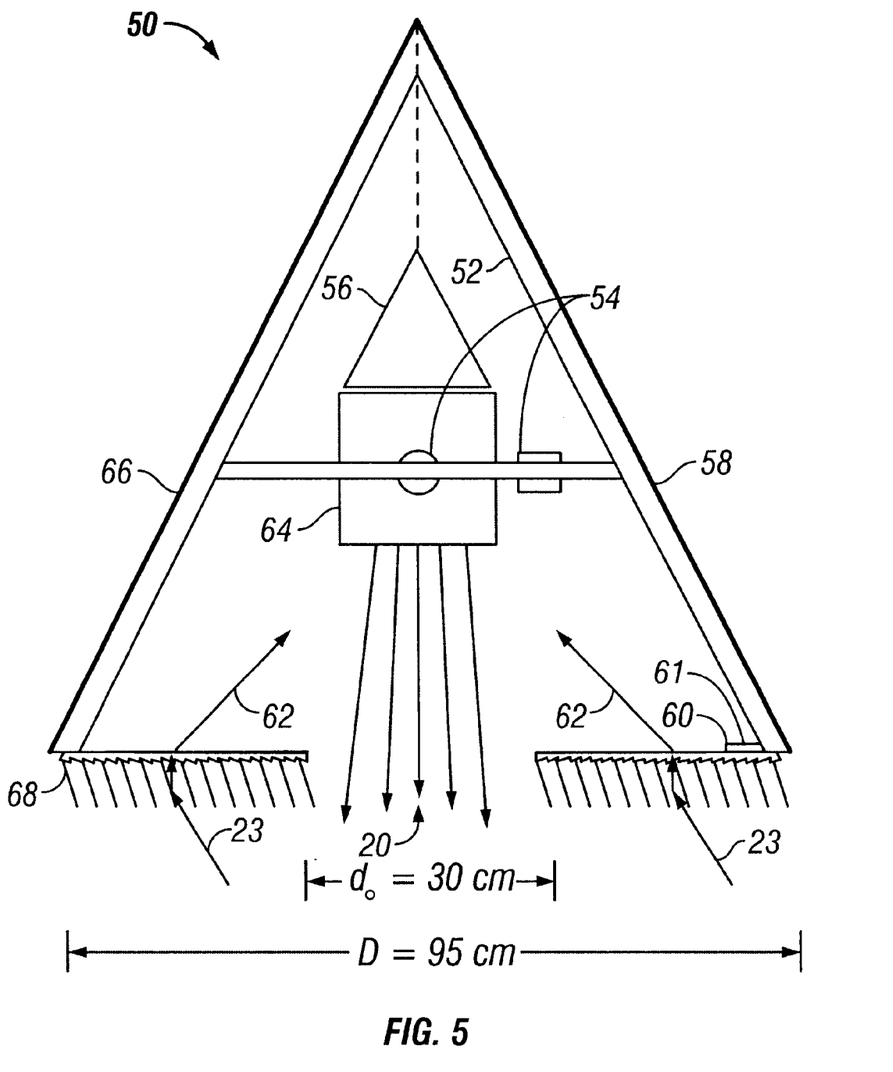
FIG. 5 illustrates an alternative embodiment of the invention in which the laser is located remotely from the spacecraft.

FIG. 5 illustrates an alternative embodiment 50 for, for example, launching a 5.61 kg payload 56 into space from the Earth within 1.0 kg structure 66 having ribs 52. Cellulose nitrate 64 (preferably 14.3 kg and 20.6 cm wide) is capable of large coupling coefficients. A time-average intensity of 3 kW/cm² on the ablator 64 is required for takeoff thrust 20 through an exhaust port 30 cm wide. Actively controlled "Venetian blind" reflectors 68 correct incidence angle on the Fresnel lens 62 during orbit injection, and help steer the craft by altering the illumination distribution so as to bias the temperature across the ablator. Some steering may also be provided by motorized gimbals 54. An overall diameter of 95 cm is governed by maximum intensity of 140 W/cm² on the Fresnel lens with a 1 MW laser beam 23, and atmosphereic drag. A diameter-to-length ratio of 1.0 is preferred. The carbon composite/carbon fiber fairing 58 (preferably 0.2 mm thick for a weight of 500 g) is preferably discarded at 120 km altitude. Onboard power is provided by a generator 60 and used by a microprocessor 61 which intercepts a small portion of the incident laser beam.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the ii present invention will be obvious to those skilled in the art and it is intended to cover in the appended claims all such modifications and equivalents. The entire disclosures of all references, applications, patents, and publications cited above are hereby incorporated by reference.

What is claimed is:

1. A thruster for a spacecraft comprising:
    a laser;
    an ablation target of said laser comprising a tape; and
    a tape transport transporting the tape across a focus of said laser;
    wherein when said laser is operating, material ablates from said ablation target, thereby generating a thrust vector on the spacecraft.
2. The thruster of claim 1 wherein said laser comprises a semiconductor diode laser.
3. The thruster of claim 2 wherein said laser comprises a plurality of semiconductor diode lasers pumping a solid state laser.
4. The thruster of claim 3 wherein said laser comprises a plurality of semiconductor diode lasers pumping a glass fiber laser.
5. The thruster of claim 1 wherein said laser is located remotely from the spacecraft.
6. The thruster of claim 1 additionally comprising a focusing device in a path of light produced by said laser.
7. The thruster of claim 6 wherein said focusing device focuses laser light on said ablation target within a spot of between approximately 5 and 200 micrometers in diameter.
8. The thruster of claim 7 wherein power of said laser light is approximately 1 watt.
9. The thruster of claim 1 wherein said ablation target comprises a substantially light-absorbing pigment suspended in a polymer.
10. The thruster of claim 9 wherein said polymer is selected from the group consisting of polyvinylchloride and polymethylmethacrylate.
11. The thruster of claim 9 wherein said ablation target additionally comprises a transparent layer supporting said polymer.
12. The thruster of claim 11 wherein said transparent layer is selected from the group consisting of transparent polymers and optical glass.
13. The thruster of claim 1 wherein when said laser is operating, material ablates from said ablation target to form a plasma jet.
14. The thruster of claim 13 wherein said thruster lacks a nozzle.
15. The thruster of claim 13 wherein said plasma jet is substantially electrically neutral.
16. The thruster of claim 1 wherein said thruster produces continuous thrust of as little as approximately 0.4 mN.
17. A spacecraft propulsion method comprising the steps of:
    providing a laser;
    directing the laser at an ablation target comprising a tape; and
    transporting the tape across a focus of the laser;
    wherein when the laser is operating, material ablates from the ablation target, thereby generating a thrust vector on the spacecraft.
18. The method of claim 17 wherein the providing step comprises providing a semiconductor diode laser.
19. The method of claim 18 wherein the providing step comprises providing a plurality of semiconductor diode lasers pumping a solid state laser.
20. The method of claim 19 wherein the providing step comprises providing a plurality of semiconductor diode lasers pumping a glass fiber laser.
21. The method of claim 17 wherein the providing step comprises providing a laser located remotely from the spacecraft.
22. The method of claim 17 additionally comprising the step of focusing light produced by the laser.
23. The method of claim 22 wherein the focusing step comprises focusing laser light on the ablation target within a spot of between approximately 5 and 200 micrometers in diameter.
24. The method of claim 23 wherein the providing step comprises providing a laser producing laser light with a power of approximately 1 watt.
25. The method of claim 17 wherein in the directing step the ablation target comprises a substantially light-absorbing pigment suspended in a polymer.
26. The method of claim 25 wherein in the directing step the polymer is selected from the group consisting of polyvinylchloride and polymethylmethacrylate.
27. The method of claim 25 wherein in the directing step the polymer is supported by a transparent layer through which laser light passes.
28. The method of claim 27 wherein in the directing step the transparent layer is selected from the group consisting of transparent polymers and optical glass.
29. The method of claim 17 wherein when the laser is operating, material ablates from the ablation target to form a plasma jet.
30. The method of claim 29 wherein the plasma jet is not confined by a nozzle.
31. The method of claim 29 wherein the plasma jet is substantially electrically neutral.
32. The method of claim 17 wherein the method produces continuous thrust of as little as approximately 0.4 mN.
33. A thruster for a spacecraft comprising:
    a laser;
    an ablation target of said laser; and
    a focusing device in a path of light produced by said laser wherein said focusing device focuses laser light on said ablation target within a spot of between approximately 5 and 200 micrometers in diameter;
    wherein when said laser is operating, material ablates from said ablation target, thereby generating a thrust vector on the spacecraft.
34. A thruster for a spacecraft comprising:
    a laser; and
    an ablation target of said laser comprising a substantially light-absorbing pigment suspended in a polymer;
    wherein when said laser is operating, material ablates from said ablation target, thereby generating a thrust vector on the spacecraft.

35. A thruster for a spacecraft comprising:

a laser; and an ablation target of said laser;

wherein when said laser is operating, material ablates from said ablation target, thereby generating a thrust vector on the spacecraft; and wherein said thruster has a mass of at most approximately 0.4 kg.

36. A thruster for a spacecraft comprising:

a laser; and an ablation target of said laser;

wherein when said laser is operating, material ablates from said ablation target, thereby generating a thrust vector on the spacecraft; and wherein said thruster produces continuous thrust of as little as approximately 0.4 mN.

37. A spacecraft propulsion method comprising the steps of:

providing a laser;

directing the laser at an ablation target; and focusing light produced by the laser on the ablation target within a spot of between approximately 5 and 200 micrometers in diameter;

wherein when the laser is operating, material ablates from the ablation target, thereby generating a thrust vector on the spacecraft.

38. A spacecraft propulsion method comprising the steps of:

providing a laser; and directing the laser at an ablation target comprising a substantially light-absorbing pigment suspended in a polymer;

wherein when the laser is operating, material ablates from the ablation target, thereby generating a thrust vector on the spacecraft.

39. A spacecraft propulsion method comprising the steps of:

providing a laser; and directing the laser at an ablation target;

wherein when the laser is operating, material ablates from the ablation target, thereby generating a continuous thrust vector on the spacecraft of as little as approximately 0.4 mN.

* * * * *